C. P. Bailey,
Wood Molding Machine.
Nº 12,088. Patented Dec. 19, 1854.
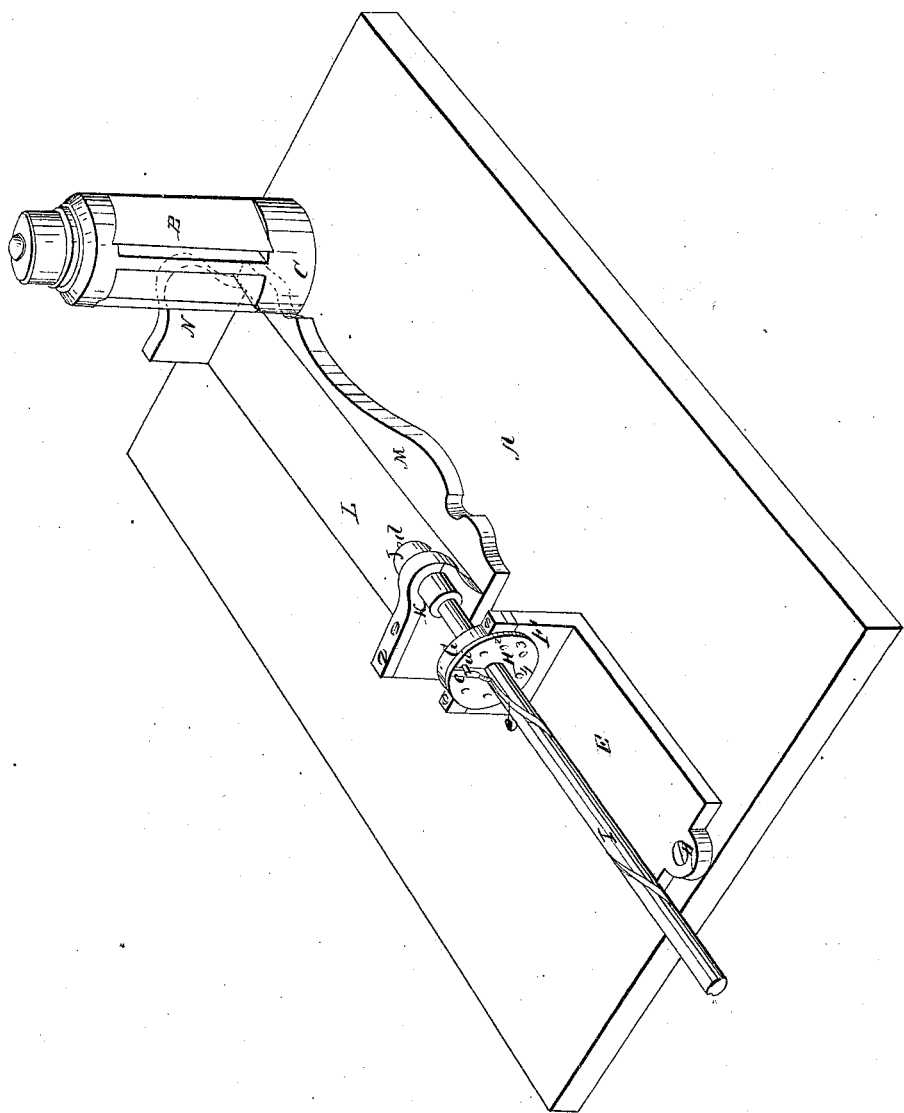

UNITED STATES PATENT OFFICE.

CHARLES P. BAILEY, OF ZANESVILLE, OHIO.

FEEDING APPARATUS TO MACHINES FOR CUTTING IRREGULAR FORMS.

Specification of Letters Patent No. 12,088, dated December 19, 1854.

*To all whom it may concern:*

Be it known that I, CHARLES P. BAILEY, of Zanesville, in the county of Muskingum and State of Ohio, have invented certain new and useful Improvements in Apparatus for Feeding up the Material to Rotating Cutter-Heads for Cutting Irregular Forms; and I do hereby declare the following to be a full, clear, and exact description of the same, reference being had to the accompanying drawing, making a part thereof, and which represents a perspective view of the entire apparatus.

The nature of my invention consists in combining with a pattern, having the outline of the thing to be cut upon it, and which moves past, and is guided by the head of the cutting cylinder, a mandrel united to a long helically or spirally grooved shaft, so that the material to be cut, may have the outline of the pattern formed helically or spirally around it, instead of in right lines, as will be described.

To enable others skilled in the art to make and use my invention, I will proceed to describe the same with reference to the drawings.

A represents a table through which projects a rotating cutter B, of any known construction, preferring that, however, represented and described in the patent of Nathaniel Gear of the 8th of November 1853, and driven by any well known arrangement of belts and pulleys. The head C of the cutting cylinder, forms the guide and directrix to the pattern.

At a suitable point D, on the table, is pivoted a rest E, so that it may freely turn to or from the cylinder, as the pattern passes its guide or directrix. Upon an upright portion F, of said rest or yielding support E, is placed a sleeve or boss G, and against it a graduated plate H which by means of a pin *a*, passing through either of the holes 1, 2, 3, 4, &c., and into the sleeve or boss G, admits of its being turned to any required portion of a revolution and there held. On the said plate H is also arranged, a stud *c* the lower end of which projects into the spiral or helical groove *e*, in the shaft I, so that as said shaft is forced through the plate and boss, it will turn round in exact conformity with the turns of the groove.

J, is a mandrel so arranged in a support K, on the frame or carriage L, which carries the pattern M, as to freely turn therein, and said mandrel may be furnished with points *d*, or any of the usual devices for holding one end of the piece to be cut, the other end of said piece being centered on the other end N, of said carriage. The shaft I, is made to fit into the mandrel J, so that the two must turn together. By this means the outline of the pattern M, is cut spirally around the material placed on the mandrel, on one, two, three, or more sides. If it is desirable to reverse the spirals, that is to have one set run from left to right, and another set running across them from right to left, it may be readily done, by changing the shaft, for one with a reversed groove. Or the shaft may have two reversed grooves cut in it, so that it may turn the piece to be cut either way. It is obvious that by lengthening or shortening the turns of the grooves on the shaft, the spirals on the piece to be cut, will be equally lengthened or shortened, and when the spirals are reversed, a piece may be cut into almost any form, whilst its whole surface is covered in diamond shaped forms.

The material to be cut, may be fed past the cutting cylinder, by hand, or by geared machinery, as it should be moved with an uinform motion, due to the turning of the piece by the mandrel.

This feeding apparatus connected with the aforementioned machine of Nathaniel Gear, adapts that machine to the cutting of ornamental irregular forms, never before arrived at by so simple and efficient means. A stair railing for instance, may be cut out in any curved or irregular form, and then double spiral moldings may be cut upon it, crossing each other at any angle. Walking canes of the most beautiful patterns may be cut in it. Looking glass and picture frames, and indeed any shape, for which a pattern can be made, may be reproduced in the course of a few minutes, and wrought spirally around the piece.

Having thus fully described the nature of my invention what I claim therein as new and desire to secure by Letters Patent is—

The hinging or pivoting of the rest to the table, and uniting the carriage, that carries the block and pattern thereto, by means of a mandrel which may be turned at pleasure by a helically grooved rod or shaft, for the purpose of cutting twisted or spirally formed pieces, as they pass the cutter head, substantially as herein described.

CHAS. P. BAILEY.

Witnesses:
A. B. STOUGHTON,
THOMAS H. UEPPERMAN.